(12) United States Patent
Jahaniaval

(10) Patent No.: US 7,713,570 B2
(45) Date of Patent: May 11, 2010

(54) PROCESS FOR PREPARING HIGH LIQUID OIL, NO TRANS, VERY LOW SATURATES, REGULAR MARGARINE WITH PHOSPHOLIPIDS

(76) Inventor: Firouz Jahaniaval, 71 Proctor Avenue, Thornhill, ON (CA) L3T 1M6

( * ) Notice: Subject to any disclaimer, the term of this patent is extended or adjusted under 35 U.S.C. 154(b) by 926 days.

(21) Appl. No.: 11/105,497

(22) Filed: Apr. 14, 2005

(65) Prior Publication Data
US 2005/0233056 A1     Oct. 20, 2005

Related U.S. Application Data

(60) Provisional application No. 60/561,894, filed on Apr. 14, 2004.

(51) Int. Cl.
*A23D 7/01* (2006.01)
(52) U.S. Cl. ...................... 426/604; 426/603
(58) Field of Classification Search ................. 426/603
See application file for complete search history.

(56) References Cited

U.S. PATENT DOCUMENTS

| | | | | |
|---|---|---|---|---|
| 2,640,780 A | * | 6/1953 | Mattikow | 426/604 |
| 2,910,362 A | * | 10/1959 | Davis et al. | 426/545 |
| 3,338,720 A | * | 8/1967 | Pichel | 426/602 |
| 3,661,795 A | * | 5/1972 | Pardun | 516/56 |
| 3,661,946 A | * | 5/1972 | Pardun | 554/83 |
| 3,682,656 A | * | 8/1972 | Wilton | 426/603 |
| 3,796,815 A | * | 3/1974 | Lincklaen | 426/604 |
| 4,478,866 A | * | 10/1984 | Ohta et al. | 426/549 |
| 4,976,984 A | * | 12/1990 | Yasukawa et al. | 426/602 |
| 5,756,142 A | * | 5/1998 | Reckweg et al. | 426/603 |
| 5,955,327 A | * | 9/1999 | Hirai et al. | 435/128 |
| 6,045,853 A | * | 4/2000 | Reddy | 426/603 |
| 6,395,324 B1 | * | 5/2002 | Effey et al. | 426/606 |

FOREIGN PATENT DOCUMENTS

| | | | |
|---|---|---|---|
| NL | EP0141442 | * | 5/1985 |
| NL | EP0253429 | * | 1/1988 |
| WO | WO0180659 | | 11/2001 |

OTHER PUBLICATIONS

Rose, A and Rose, E. 1966. The Condensed Chemical Dictionary, 7th edition, Reinhold Publishing Corporation, New York, p. 552-553.*

* cited by examiner

*Primary Examiner*—Carolyn A Paden
(74) *Attorney, Agent, or Firm*—Patricia Folkins; Bereskin and Parr LLP

(57) ABSTRACT

The present invention provides a method for the preparation of high liquid oil margarine in the form of a water-in-oil emulsion wherein selected phospholipids (for example, PC, PE and lyso-PC/PE) play an important role in stabilizing the margarine. The total fat content of said high liquid oil margarine is made up of a minimum of about 96% liquid oil and a maximum of about 4% added hard fat and phospholipids. The method comprises preparing a water-in-oil emulsion by blending an aqueous phase with oil phase at a temperature above the crystallization temperature of the added hard fat and reducing said temperature until hard fat crystallization occurs, and supercooling in heat exchanger to obtain a high liquid oil margarine. The method of the invention uses selected phospholipids and the use of heat exchanger "votator" for fat crystal nucleation and provides a margarine comprising very low levels of saturated fats and virtually no trans fatty acids.

16 Claims, No Drawings

PROCESS FOR PREPARING HIGH LIQUID OIL, NO TRANS, VERY LOW SATURATES, REGULAR MARGARINE WITH PHOSPHOLIPIDS

FIELD OF THE INVENTION

The present invention is in the field of food preparation, particularly in the preparation of healthy and value added margarine and butter substitutes.

BACKGROUND OF THE INVENTION

Regular margarine contains of 80% fat by weight and 20% aqueous phase (with a maximum water content of 16%). Regular margarine is a water-in-oil emulsion in which the water phase is emulsified in oil phase by protein (usually milk protein as an emulsifier). The oil phase in most margarines contain 17-20% saturated fat, however between 30-35% of saturated fat is trans fat which is produced during the manufacturing of partially hydrogenation of fat. The amount of trans fat can be varied in regular margarine (30-50%) depending upon the quality of fat. In a normal processing of margarine (a water-in-oil emulsion) the fat phase is thermally prepared by dissolving the fat in liquid oil and mixing with aqueous phase (containing water, emulsifier, salt, preservative and color) to produce a water-in-oil emulsion. This emulsion is rapidly cooled in a scraped surface heat exchanger (so called Votator or Perfector) to achieve fat crystal nucleation. The Votator consists of two main parts (A and B units). The "A" unit is a coolant and supercools the margarine below its crystallization point to produce fat crystals; whereas the "B" unit is a pin worker in which the mass is worked vigorously to complete crystal formation and reduce the crystal size and then allowed to rest to achieve phase stabilization prior to packaging.

For many years, it has been known that the saturated and trans fats are "unhealthy" in margarine. Most margarines on the market today, however, are manufactured with partially hydrogenated fats and as a consequence can still contain substantial quantities of trans and saturated fatty acids. Data from the Institute of Shortening and Edible Oils (ISEO) indicate that high levels of trans fats in the diet may raise LDL (bad) cholesterol levels and lower HDL (good) cholesterol levels. The concern about saturated fatty acids was initially addressed when the industry launched soft tub margarines. For tub-type margarines, a typical composition of the fat phase is 33-52% monounsaturated fat, 29-48% polyunsaturated fat and 17-20% saturated fat. Tub margarine with 17-20% saturated fat is stable against coalescence of water droplets since water droplets become trapped within the saturated fat crystal network. If regular margarine (water-in-oil emulsion) prepared with low saturated fat (5-10%), the stability and mouthful of finished margarine would be reduced and water droplets become coalesced and eventually the oil and water phase will be separated. It is almost impossible to produce and stabilize a regular margarine with 2-4% added solid fat using traditional regular margarine manufacturing procedure.

Although recent introduction of margarines with interesterified fat to the market eliminated the trans fats, it did not reduce the amount of saturated fats significantly. Interesterification is a process that rearranges the fatty acid groups within and between different triglycerides to adjust the melting range of a fat and oil mixture. As a consequence the solid fat content (SFC) of the mixture reduces due to dissolved intermediate melting point triglycerides in the oil and show less SFC, but in fact the saturated fatty acids remain high. A typical margarine produced with intersterified fat contain 10-15% saturates. The process of random interesterification of fat is expensive, using toxic chemicals and adding significant costs to the manufacture of products contain intersterified fats.

A recent invention in production of margarine involving a double emulsion system eliminates trans fats and reduces the added solid fat down to 4%, however this procedure requires production and stabilization of two oil-in-water emulsions and mixing them under certain conditions to avoid phase separation prior to solidification and stabilization in the form of oil-in-water-in-oil emulsion system (see Kakuda et al. PCT Patent Application WO 01/80659, published on Nov. 1, 2001). This procedure also requires additional machineries such as homogenizer and preparation of emulsions in a batch system and it takes a long time to finish the product, which affects the product cost. In this procedure the uniformity of the product's texture is less consistent and can be vary in each batch.

There remains a need for a simple and economical process to produce a regular margarine (water-in-oil emulsion) with no trans fatty acids and minimal (for e.g. 2-4%) amounts of saturated fats. Such a procedure should not require additional equipment and be amenable to use in any regular margarine production line.

SUMMARY OF THE INVENTION

The present invention relates to a method to produce and stabilize a regular margarine (water-in-oil emulsion) with high liquid oil content, no trans fat and very low amount of added solid fat, using certain phospholipids (for example, phosphotidylcholine (PC), phosphotidylethanolamine (PE), lyso-phosphatidylcholine (lyso-PC) and/or lyso-phosphatidylethanolamine (lyso-PE)) as stabilizing agents. The total fat content of this margarine comprises a maximum of about 2-4% added hard fat, a minimum of about 96-98% liquid oil and about 0.5-1% phospholipids.

Accordingly, the present invention includes a method for preparing a stable high liquid oil margarine comprising:
  (a) combining an oil phase comprising about 2-4% added hard fat, about 0.5-1% phospholipids and about 96-98% liquid oil with an aqueous phase; and
  (b) treating said combined oil and aqueous phase under conditions to produce a margarine.

The present invention also relates to a stable high liquid oil margarine comprising a maximum of about 2-4% added hard fat, a minimum of about 96-98% liquid oil and about 0.5-1% phospholipids, prepared using the method of the present invention.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

DETAILED DESCRIPTION OF THE INVENTION

A simple and economical method to produce a margarine containing virtually no trans fatty acids and minimal amounts of saturated fats has been developed. The total fat content in the margarine prepared using this method comprises a maximum of about 2-4% added hard fat, a minimum of about 96-98% liquid oil and 0.5-1% phospholipids. This provides a margarine having a final composition made up of approximately 2-4% (by weight) added hard fat.

Accordingly, the present invention includes a method for preparing a stable high liquid oil margarine comprising:

(a) combining an oil phase comprising about 2-4% added hard fat, about 0.5-1% phospholipids and about 96-98% liquid oil with an aqueous phase; and (b) treating said combined oil and aqueous phase under conditions to produce a margarine.

As used herein, the term "liquid oil" is understood to mean a mixture of triglycerides which is a liquid at temperatures of greater than about 5° C. The term "high liquid oil margarine" refers to a margarine wherein the fat phase comprises greater than about 90% of liquid oil and wherein the product has sufficient hardness for use as a spreadable, tub-type margarine. The term "hard fat" as used herein refers to a fat comprising at least about 98-99% of a fully saturated (fractionated or hydrogenated) fat and wherein the total level of trans-fatty acid present is between about 0-1%. Fully saturated fats are substantially free of trans fatty acids, although low levels of trans fatty acids may be formed in or be present in such fats. Such hard fats will be solid at temperatures below about 40° C. The term "added hard fat" as used herein refers specifically to the hard fat added to the liquid oil to make up the fat phase of the high liquid oil margarine. It differs from the small amounts of saturated fatty acids found naturally in the liquid oil triacylglycerols.

Phospholipids that are suitable for use in the method of the present invention include those which can stabilize a high liquid oil margarine. In an embodiment of the invention, the phospholipid is one that interacts, for example by binding, to both fat crystals and liquid oil. Examples of phospholipids that may be used in the method of the invention include, but are not limited to, one or more of phosphotidylcholine (PC), phosphotidylethanolamine (PE), lyso-phosphatidylcholine (lyso-PC) and lyso-phosphatidylethanolamine (lyso-PE) and other phospholipids having similar functionality. In an embodiment of the invention, the phospholipids comprises a mixture of PC, PE, lyso-PC and lyso-PE. In a further embodiment of the invention, the ratio of PC:PE/lysoPC/lysoPE ranges from about 20:80 to about 75:25, suitably about 70:30. In an embodiment of the invention, the phospholipids are extracted from soy lecithin, in particular, the phospholipids are those which may be extracted using ethanol and/or iso-propanol and/or acetone. In a further embodiment of the invention, the soy lecithin is extracted with a solvent that does not dissolve phosphatidylserine (PS) and/or phosphatidylinositol (PI).

The term "virtually no trans fatty acids" as used herein in reference to the final margarine product, means a margarine comprising less than about 0.01-0.5%, specifically less than about 0.1%, trans fatty acids.

In an embodiment of the invention, the liquid oil may be selected from any suitable non-hydrogenated oil which is a liquid at temperatures greater than about 5° C. Examples of such oils include, but are not limited to, canola oil, sunflower oil, safflower oil, fish oil, soybean oil, cotton oil, corn oil, olive oil and peanut oil. In an embodiment of the invention, the liquid oil is soybean oil.

In another embodiment of the invention, the added hard fat is selected from any suitable fat which is a solid at temperatures below about 40° C. Examples of such fats include, but are not limited to, palm stearin, cotton stearin, corn stearin and canola stearin or mixtures thereof. The hard fat may also include a combination with intermediate melting point triglycerides such as interesterified fat, cocoa butter or cocoa butter substitution and or any fractionated fat with melting point of 34-40° C. In an embodiment of the invention, the added hard fat is a mixture comprising cotton stearin, palm and canola stearins. In a further embodiment of the invention, the added hard fat is a mixture of cotton stearin with cocoa butter substitution with no trans fat.

Other additives, typically used in the preparation of comestible spreads, may also be added to the margarine product. Such additives include, but are not limited to, coloring agents, flavoring agents, other emulsifiers, vitamins, antioxidants, salt and preservatives.

All percentages used herein refer to a percentage of the weight of a specified mixture, component of the margarine or the margarine itself.

The stabilization of the high liquid oil margarine, with a fat content made up of only about 2-4% added hard fat and about 96-98% liquid oil and about 0.5-1% phospholipids, is based on the use of phospholipids and fat crystals, and blending the phospholipids and hard fat using the appropriate type and ratio and temperature. Because the amount of liquid oil is too large to be stabilized by the about 2-4% added hard fat in the emulsion, the method involves the use of certain phospholipids to stabilize the system. By using 0.5-1% phospholipids (for example, PC, PE and/or lyso-PC/lyso-PE) and hard fat (stearins and or intermediate melting point triglycerides) about 96-98% of the liquid oil in margarine can be stabilized. Under these conditions, the added hard fat amounts would be a maximum of 2-4% in final product. The hard fat fraction (including added hard fat and phospholipids) of the present invention can be made in a standard margarine plant or in separate unit and submitted to the margarine industry.

In an embodiment of the invention, the oil phase comprises (as a percentage by weight of the oil phase only) about 2-4%, suitably about 3.2%, by weight of added hard fat (stearin and intermediate melting point triglycerides), about 0.5-1%, suitably about 0.8%, by weight of one or more phospholipids and, optionally, about 0.03%-0.5%, suitably about 0.1%, by weight of one or more oil soluble flavoring agents (for example, butter flavour), one or more oil soluble vitamins (for example vitamin A), one or more oil soluble antioxidants and/or one or more oil soluble colouring agents (suitable coloring agents include beta-carotene and annatto, with beta-carotene being a suitable example). The oil phase can be prepared by simply dissolving the hard fat, phospholipids and butter flavour, and optionally vitamin A, an antioxidant, flavouring agent and/or coloring agent in the liquid oil, in any order, with thorough mixing and warming.

In another embodiment of the invention, the aqueous phase for water-in-oil emulsion comprises ingredients which are typical for aqueous phases in a margarine product. For example, the aqueous phase may comprise (expressed as a percentage by weight of the aqueous phase only) about 7.5%-20%, suitably about 10%, by weight of one or more water soluble emulsifying agents, such as whey protein powder, and about 5%-10%, suitably about 7.5%, by weight of salt, the remainder of the phase being water. Water soluble emulsifying agents may be selected from any suitable water soluble emulsifying agent, including one or more of whey powder, sodium caseinate, whey protein isolates and soy protein isolates. A suitable water soluble emulsifying agent is whey protein powder. The aqueous phase may also comprise about 1%-2%, suitably about 1.5%, of one or more preservatives, which may be selected from any suitable preservative, including sodium benzoate, calcium sorbate and potassium sorbate, with sodium benzoate being a suitable example. The aqueous phase may be prepared, for example, by warming the water to a temperature in the range of 40° C. to 60° C. (while not exceeding 60° C.), suitably at about 45° C.-55° C., adding, in any order, the emulsifying agent(s), salt and/or preservative(s) and mixing until everything is dissolved.

To prepare the water-in-oil emulsion, the oil phase and the aqueous phase are suitably prepared separately.

To prepare the water-in-oil emulsion, the oil phase is suitably added to the warmed aqueous phase gradually and with mixing. The mixing speed can be in the range of about 500-3000 rpm, suitably at about 2,000 rpm. The addition rates, mixing speeds and mixing shears may vary depending on the volumes of the oil and water phases. A person skilled in the art would be able to determine the proper addition rates, mixing speeds mixing shears for a particular volume of material by adjusting the addition rates, mixing speeds and shear forces during the addition of the oil phase to the water phase and using an addition rate, mixing speed and shear force that allows a suitable water particle size in oil to form.

Once suitably combined, the mixture can be supercooled using, for example, a heat exchanger. Supercooling may be achieved using any suitable method, such as using a "votator" or a "perfecter" set at a temperature of about −5° C. to −10° C. While not wishing to be limited by theory, it is believed that supercooling crystallizes the hard fat and interact the phospholipids with hard fat fraction and stabilizes the system within an expanded phospholipids-fat crystal network. The resulting margarine can be mixed in "votator" until desired hardness and texture are achieved. The desired hardness and texture is one that is suitable for spreadable tub-type margarines.

In embodiments of the present invention, the oil phase is prepared by combining the added hard fat and phospholipids mixture with blending at a temperature above the crystallization point of the added hard fat fraction, to provide a mixture of hard fat and phospholipids. In a further embodiment involving the direct use of added hard fat and phospholipids in a margarine plant, both fractions are added into the liquid oil and mixed under heat (about 55-60° C.) to produce the margarine oil phase. In a further embodiment of the invention, if the added hard fat and phospholipids mixture are combined at a different time and/or location then, the temperature of the added hard fat and phospholipid mixture can be reduced until crystallization occurs to produce a margarine hard fat fraction (solid fat) and this hard fat fraction mixture may be later combined with the liquid oil and mixed under heat (55-60° C.) to produce margarine oil phase.

In processing of the regular margarine (water-in-oil emulsion), the oil phase is typically blending with aqueous phase (containing water, and for example, protein and salt) at about 50-55° C., followed by supercooling with heat exchanger (votator or perfecter) to obtain a high liquid oil margarine.

In another aspect of the present invention, there is included a method for preparing a stable high liquid oil margarine comprising:
(a) preparing an oil phase comprising about 2-4% added hard fat, about 0.5-1% phospholipids and about 96-98% liquid oil;
(b) combining said oil phase with an aqueous phase; and
(c) treating said combined oil and aqueous phase under conditions to produce a margarine.

In yet another aspect of the present invention there is included a method for the preparation of a high liquid oil margarine wherein the total fat content of the margarine comprises a minimum of about 96% liquid oil and a maximum of about 4% added hard fat, comprising:
(I) preparing a hard fat fraction comprising:
   (a) combining one or more phospholipids and added hard fats;
   (b) combining one or more liquid oils and one or more flavoring agents; and
   (c) combining (a) and (b) at temperature above the crystallization temperature of the added hard fat;
(II) preparing an aqueous phase comprising one or more emulsifiers, salt, one or more preservative, and water;
(III) preparing a water-in-oil emulsion by adding the oil phase to the aqueous phase at a temperature above the crystallization temperature of the added hard fat, with continuous blending;
(IV) supercooling the water-in-oil emulsion until hard fat crystallization occurs; and
(V) mixing until a high liquid oil margarine is obtained.

In another of its aspects, the present invention also provides a high liquid oil margarine wherein the total fat content of said high liquid oil margarine comprises a minimum of about 96-98% liquid oil, a maximum of about 2-4% added hard fat and 0.5-1% phospholipids, said margarine being prepared using a method as described herein.

In an embodiment of the present invention there is also provided a high liquid oil margarine wherein the total fat content of said high liquid oil margarine comprises a minimum of about 96% liquid oil, a maximum of about 4% added hard fat and 0.5-1% phospholipids, said margarine being prepared using a method as described herein.

The margarine product prepared using the method of the present invention is not only advantageous due to the health benefits of eliminating trans fatty acids and lowering saturated fates, but also due to the value added health benefits of certain phospholipids, in particular phosphatidylcholine (a known brain nutrient).

The following non-limiting examples are illustrative of the invention:

EXPERIMENTAL EXAMPLES

Example 1

Extraction of Ethanol or Isopropanol and or Acetone Soluble Fractions of Soy Lecithin Solvents such as ethanol and isopropanol were used to extract PC, PE, lyso-PC and lyso-PE from soy lecithin under non-heat or heat treatment conditions. The 5:1 ratio of solvent and soy lecithin (solvent:lecithin ratio can be varied between 2:1 to 10:1) was mixed in a beaker and stirred thoroughly with high shear agitator to produce small particles of lecithin-in-solvent mixture. Mixing time is dependent upon the amount of solvent-lecithin mixture and the shear rates. The mixture creates two immiscible phases after stopping agitation and sitting the mixture at room temperature: 1) upper phase-containing solvent and phospholipids (PC, lyso-PC and PE) and small amount of other phospholipids; 2) lower phase-containing soy lecithin with lower amount of PC, lyso-PC, PE and materials which did not dissolve in ethanol or isopropanol such as soybean oil. The upper phase was decanted and evaporated to remove ethanol or isopropanol from the mixture and the residual was collected as enriched PC, PE and lyso-PC-PE. In similar procedure acetone was used to extract lyso-PC-PE and soybean oil from soy lecithin using the same ratio of solvent and lecithin. Practically acetone does not dissolve some phospholipids specially, phosphatidylinositol (PI), phosphotidylserine (PS) and phosphatidylcholine (PC). The acetone soluble fraction of lecithin was decanted and evaporated to extract the soybean oil, lyso-PC and PE. The extracted acetone soluble fraction of lecithin was mixed with PC obtained from the market or by extraction from lecithin to produce PC, lyso-pC-PE and PE mixture. The amount of PC and lyso-PC/PE comprises between 20:80 to 70:30% (PC: lyso-PC/PE) in each extraction or combination.

Example 2

Procedure for Making Hard Fat Fraction (Solid Fat) in Production of Regular Margarine The hard fat fraction in regular margarine is produced by adding ethanol, isopropanol and or acetone fractions of lecithin into the stearins such as canola, cotton, soy, palm stearins and intermediate melting point triglycerides (IMP triglycerides) such as interesterified fats, cocoa butter, cocoa butter substitutes having SOS, POS and POP composition in their triglyceride backbone using heat to dissolve ethanol, isopropanol and acetone fractions of lecithin in stearin or IMP triglycerides. The mixture was heated up to 70° C. to dissolve phospholipids and stearins. The proportion of phospholipids and stearins can be varied from 1:1 to 1:5 (phospholipids: stearins) to produce regular margarine hard fat fraction.

Example 3

Representative Formulation

| Ingredient | Water-in-oil emulsion (%)* |
| --- | --- |
| Water | 16.0 |
| Sodium Benzoate | 0.015 |
| Sodium Chloride | 1.9 |
| liquid Oil (soybean) | 76 |
| Butter Flavor | 0.075 |
| Whey Powder | 2 |
| Phospholipids (PC, lyso-PC-PE) | 0.8 |
| Intermediate melting point triglyceride | 0.5 |
| Cotton Stearin | 2.7 |
| Beta-Carotene Vitamin A antioxidant | 0.01 |

*percent by weight of the final mixture

Processing Procedures (using above ratios):

Water-in-Oil Emulsion

An aqueous phase was prepared by warming water to about 45° C.-55° C. (not exceeding 60° C.) and adding whey protein and sodium benzoate. The whey protein, salt and sodium benzoate were completely dissolved in the water by thoroughly mixing with a medium shear rate mixer. An oil phase was prepared by dissolving phospholipids, stearin and butter flavor in soybean oil. It is worth noting that with the amount of 0.5-1% of selected phospholipids it may not needed to add coloring agent since the natural color in phospholipids can produce enough butter like color. An emulsion was prepared by adding the oil phase to the warm aqueous phase with continuous blending with the medium shear rate mixer with the rate of mixing speed of about 2,000 rpm. Other rates and blending speed may be preferred under other conditions, for example, when using different volume.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

I claim:

1. A method for preparing a stable high liquid oil, spreadable, tub-type margarine comprising:
   (a) combining an oil phase comprising about 2-4% added hard fat, about 0.5-1% phospholipids and about 96-98% liquid oil with an aqueous phase; and
   (b) treating said combined oil and aqueous phase under conditions to produce a spreadable, tub-type margarine, wherein the phospholipids are ethanol and/or isopropanol soluble phospholipids from soy lecithin comprising a mixture of phosphatidylcholine (PC), phosphatidylethanolamine (PE), lyso-phosphatidylcholine (lyso-PC) and lyso-phosphatidylethanolamine (lysoPE), wherein the ratio of PC:PE/lysoPC/lysoPE is from about 20:80 to about 75:25.

2. The method according to claim 1, wherein the ratio of PC: PE/lysoPC/lysoPE is 70:30.

3. The method according to claim 1, wherein the liquid oil is selected from one or more of canola oil, sunflower oil, safflower oil, fish oil, soybean oil, cotton oil, corn oil, olive oil and peanut oil.

4. The method according to claim 3, wherein the liquid oil is soybean oil or canola oil.

5. The method according to claim 1, wherein the added hard fat comprises a fat that is a solid below about 40° C. selected from one or more of palm stearin, cotton stearin, corn stearin, and canola stearin and/or further comprises one or more intermediate melting point triglycerides or any fractionated fat with melting point of about 34-40° C.

6. The method according to claim 5, wherein the added hard fat is a mixture comprising cotton stearin, palm stearin and/or canola stearins, optionally with cocoa butter substitution with no trans fat.

7. The method according claim 1 further comprising adding other additives, typically used in the preparation of comestible spreads, to the oil phase and/or to the water phase.

8. The method according to claim 7, wherein the additives are selected from one or more of coloring agents, flavoring agents, other emulsifiers, vitamins, antioxidants, salt and preservatives.

9. The method according to claim 1, wherein the oil phase is added to the aqueous phase.

10. The method according to claim 9, wherein the aqueous phase is at a temperature of about 40° C. to about 60° C.

11. The method according to claim 1, wherein said conditions to produce a margarine comprise supercooling and mixing.

12. A high liquid oil, spreadable, tub-type margarine wherein the total fat content of said high liquid oil margarine comprises a minimum of about 96% liquid oil, a maximum of about 4% added hard fat and 0.5-1% phospholipids, said margarine being prepared using the method according to claim 1.

13. The high liquid oil margarine according to claim 12, wherein the ratio of PC:PE/lysoPC/lysoPE is 70:30.

14. A method for the preparation of a high liquid oil, spreadable, tub-type margarine wherein the total fat content of the margarine comprises a minimum of about 96% liquid oil and a maximum of about 4% added hard fat, comprising:
   (I) preparing a hard fat fraction comprising:
      (a) combining one or more phospholipids and added hard fats;

(b) combining one or more liquid oils and one or more flavoring agents; and (c) combining (a) and (b) at temperature above the crystallization temperature of the added hard fat;

(II) preparing an aqueous phase comprising one or more emulsifiers, salt, one or more preservative, and water;

(III) preparing a water-in-oil emulsion by adding the oil phase to the aqueous phase at a temperature above the crystallization temperature of the added hard fat, with continuous blending;

(IV) supercooling the water-in-oil emulsion until hard fat crystallization occurs; and (V) mixing until a high liquid oil, spreadable, tub-type margarine is obtained, wherein the phospholipids are ethanol and/or isopropanol soluble phospholipids from soy lecithin comprising a mixture of phosphatidylcholine (PC), phosphatidylethanolamine (PE), lyso-phosphatidylcholine (lyso-PC) and lyso-phosphatidylethanolamine (lysoPE), wherein the ratio of PC:PE/lysoPC/lysoPE is from about 20:80 to about 75:25.

15. A high liquid oil, spreadable, tub-type margarine wherein the total fat content of said high liquid oil margarine comprises a minimum of about 96-98% liquid oil, a maximum of about 2-4% added hard fat and 0.5-1% phospholipids, said margarine being prepared using the method according to claim 1.

16. The high liquid oil margarine according to claim 15, wherein the ratio of PC:PE/lysoPC/lysoPE is 70:30.

* * * * *